United States Patent
Yamazaki et al.

(10) Patent No.: US 9,212,685 B2
(45) Date of Patent: Dec. 15, 2015

(54) LOCKING BOLT AND METHOD FOR MANUFACTURING SAME

(75) Inventors: Tadayoshi Yamazaki, Hanishina-gun (JP); Kazuki Yamazaki, Hanishina-gun (JP)

(73) Assignee: KABUSHIKI KAISHA YAMAZAKI ACTIVE, Hanishina-gun (JP)

( * ) Notice: Subject to any disclaimer, the term of this patent is extended or adjusted under 35 U.S.C. 154(b) by 2 days.

(21) Appl. No.: 14/232,397

(22) PCT Filed: Jun. 5, 2012

(86) PCT No.: PCT/JP2012/064420
§ 371 (c)(1),
(2), (4) Date: Feb. 28, 2014

(87) PCT Pub. No.: WO2013/011755
PCT Pub. Date: Jan. 24, 2013

(65) Prior Publication Data
US 2014/0308091 A1    Oct. 16, 2014

(30) Foreign Application Priority Data
Jul. 15, 2011    (JP) ................................. 2011-156277

(51) Int. Cl.
*F16B 39/28* (2006.01)
*F16B 39/00* (2006.01)
(Continued)

(52) U.S. Cl.
CPC . *F16B 39/00* (2013.01); *B21K 1/46* (2013.01); *B21K 1/56* (2013.01); *F16B 35/06* (2013.01); *F16B 39/284* (2013.01); *B21H 3/02* (2013.01)

(58) Field of Classification Search
CPC ........ F16B 39/00; F16B 35/06; F16B 39/284; B21K 1/46; B21K 1/56; B21H 3/02
USPC .......................................... 411/184–187, 967
See application file for complete search history.

(56) References Cited

U.S. PATENT DOCUMENTS

| | | | | |
|---|---|---|---|---|
| 1,635,082 | A | * 7/1927 | Hultgren | ............... F16B 39/282 |
| | | | | 411/155 |
| 1,961,470 | A | * 6/1934 | Winchester | ............... B60B 3/16 |
| | | | | 301/36.1 |

(Continued)

FOREIGN PATENT DOCUMENTS

| | | |
|---|---|---|
| GB | 2 098 695 | 11/1982 |
| JP | 1-176808 | 7/1989 |

(Continued)

OTHER PUBLICATIONS

International Search Report issued Sep. 11, 2012, in PCT/JP12/064420 filed Jun. 5, 2012.

*Primary Examiner* — Gary Estremsky
(74) *Attorney, Agent, or Firm* — Oblon, McClelland, Maier & Neustadt, L.L.P.

(57) ABSTRACT

It is an object to provide a locking bolt, which is capable of tightly fixing a member or the like at an extremely high degree of firmness without being loosened even when vibrations are repeatedly applied thereto, and is manufactured in an extremely facilitated manner. The locking bolt includes: a shank section (1) threaded on an outer circumference thereof; and a head section (2) provided at one end of the shank section (1). The head section (2) includes: a main body portion (201) having a hexagonal cross-sectional shape; and a cylindrical skirt portion (202) provided continuously with the main body portion (201) and formed so as to be spaced radially outward from the main body portion (201) in an expanding manner along a concave surface using a catenary curve surface. The locking bolt has a structure in which: a lower edge surface (203) of an outer surface of the cylindrical skirt portion (202) is parallel to an axis (X-X) of the main body portion (201); and an inner surface of the cylindrical skirt portion (202) is hollowed into an inverted catenary curve surface-like shape with a flat portion left on a bottom rim (204).

14 Claims, 14 Drawing Sheets

(51) Int. Cl.
  *B21K 1/46* (2006.01)
  *B21K 1/56* (2006.01)
  *F16B 35/06* (2006.01)
  *F16B 39/284* (2006.01)
  *B21H 3/02* (2006.01)

(56) References Cited

U.S. PATENT DOCUMENTS

| | | | | |
|---|---|---|---|---|
| 3,194,105 A | * | 7/1965 | Gill | F16B 31/024 |
| | | | | 411/10 |
| 3,399,589 A | * | 9/1968 | Breed | F16B 33/004 |
| | | | | 264/268 |
| 5,927,921 A | * | 7/1999 | Hukari | F16B 31/06 |
| | | | | 411/186 |
| 2003/0007844 A1 | | 1/2003 | Terry | |
| 2008/0260495 A1 | * | 10/2008 | Gong | F16B 25/0047 |
| | | | | 411/386 |

FOREIGN PATENT DOCUMENTS

| | | |
|---|---|---|
| JP | 6-24223 | 3/1994 |
| JP | 7-14216 | 3/1995 |
| JP | 3860200 | 12/2006 |
| JP | 2008-249090 | 10/2008 |
| JP | 2008-272241 | 11/2008 |

* cited by examiner

LOCKING BOLT AND METHOD FOR MANUFACTURING SAME

TECHNICAL FIELD

The present invention relates to a locking bolt and a method of manufacturing the locking bolt. Specifically, the present invention relates to a locking bolt capable of firmly and tightly fixing a member or the like without being loosened even when vibrations are repeatedly applied thereto, and to a method of efficiently manufacturing the locking bolt through use of a header without involving a method that requires time and effort, such as cutting work.

BACKGROUND ART

Bolts and nuts are widely used for tightly fixing a member or the like.

However, there is a problem in that the bolts and nuts are loosened when vibrations are repeatedly applied to the tightly fixed part.

Therefore, various devices have been proposed conventionally.

For example, there is proposed a fastening member including a head section, and a tapered section having an inner surface formed into a conical curve surface and an outer surface formed into a concave curve surface (Patent Literature 1).

This fastening member is capable of firmly and tightly fixing an object to be fastened, and absorbing vibrations and shocks due to an action of the tapered section, to thereby attain an excellent locking action.

In the case of such a special shape as in this fastening member, however, only the cutting work using a lathe or the like can manufacture the fastening member without difficulties. Besides, the cutting work requires special skill in manufacture, thus leading to a problem of high cost.

Further, in recent years, there has been demanded a bolt having a further enhanced locking action.

CITATION LIST

Patent Literature

[PTL 1] JP 3860200 B

SUMMARY OF INVENTION

Technical Problem

The present invention has been made to solve the conventional problem described above, and it is therefore an object thereof to provide a locking bolt capable of tightly fixing a member or the like at an extremely high degree of firmness without being loosened even when vibrations are repeatedly applied thereto, and to provide a method of efficiently manufacturing the locking bolt through use of a header without involving a method that requires time and effort, such as cutting work.

Solution to Problem

That is, according to the invention of claim 1, there is provided a locking bolt, including:
a shank section threaded on an outer circumference thereof; and
a head section provided at one end of the shank section,
in which the head section includes:
a main body portion having a hexagonal cross-sectional shape; and
a cylindrical skirt portion provided continuously with the main body portion and formed so as to be spaced radially outward from the main body portion in an expanding manner along a concave surface using a catenary curve surface,
in which the locking bolt has a structure in which:
a lower edge surface of an outer surface of the cylindrical skirt portion is parallel to an axis of the main body portion; and
an inner surface of the cylindrical skirt portion is hollowed into an inverted catenary curve surface-like shape with a flat portion left on a bottom rim, and
in which an intersection between the inner surface of the cylindrical skirt portion and the shank section is formed into an approximately-round shape, to thereby have roundness.

According to the invention of claim 2, there is provided a locking bolt, including:
a shank section threaded on an outer circumference thereof; and
a head section provided at one end of the shank section,
in which the head section includes:
a main body portion having a hexagonal cross-sectional shape; and
a cylindrical skirt portion provided continuously with the main body portion and formed so as to be spaced radially outward from the main body portion in an expanding manner along a concave surface using a catenary curve surface,
in which the locking bolt has a structure in which:
a lower edge surface of an outer surface of the cylindrical skirt portion is parallel to an axis of the main body portion; and
an inner surface of the cylindrical skirt portion is hollowed into a substantially inverted catenary curve surface-like shape as a whole and a polyhedron-like shape having six or more corners in a circumferential direction with a flat portion left on a bottom rim, and
in which an intersection between the inner surface of the cylindrical skirt portion and the shank section is formed into an approximately-round shape, to thereby have roundness.

According to the invention of claim 3, there is provided a method of manufacturing a locking bolt,
the locking bolt including:
a shank section threaded on an outer circumference thereof; and
a head section provided at one end of the shank section,
the head section including:
a main body portion having a hexagonal cross-sectional shape; and
a cylindrical skirt portion provided continuously with the main body portion and formed so as to be spaced radially outward from the main body portion in an expanding manner along a concave surface using a catenary curve surface,
the locking bolt having a structure in which:
a lower edge surface of an outer surface of the cylindrical skirt portion is parallel to an axis of the main body portion; and
an inner surface of the cylindrical skirt portion is hollowed into an inverted catenary curve surface-like shape with a flat portion left on a bottom rim, and
an intersection between the inner surface of the cylindrical skirt portion and the shank section being formed into an approximately-round shape, to thereby have roundness, the method including:
using a header including:
a cut-off knife;
an upper die including a punch; and
a lower die including a countersinking die block fitted thereto in a mountable and demountable manner, for carrying out a countersinking process to hollow the inner surface of the cylindrical skirt portion into the inverted catenary curve surface-like shape;

cutting off a forgeable wire rod into a predetermined length by the cut-off knife, and subsequently carrying out, on the cut off forgeable wire rod, a heading process for the head section and the countersinking process by the upper die and the lower die so as to form, at one end of the forgeable wire rod, the head section including the main body portion and the cylindrical skirt portion, which is provided continuously with the main body portion and formed so as to be spaced radially outward from the main body portion in the expanding manner along the concave surface using the catenary curve surface (or apart thereof), to thereby provide the structure in which the inner surface of the cylindrical skirt portion is hollowed into the inverted catenary curve surface-like shape with the flat portion left on the bottom rim;

subsequently processing the main body portion of the head section into the hexagonal cross-sectional shape through use of an automatic trimming machine;

subsequently threading an outer circumference of the forgeable wire rod in a portion other than the head section through a rolling process so as to form the shank section; and subsequently removing an excess portion so that the lower edge surface of the outer surface of the cylindrical skirt portion becomes parallel to the axis of the main body portion.

According to the invention of claim 4, in the method according to claim 3, the countersinking die block has a horizontally symmetrical shape in which countersinking shoulder-like portions for carrying out the countersinking process are provided at an upper end and a lower end of the countersinking die block, and when one of the countersinking shoulder-like portions is worn, the countersinking die block is inverted for further use.

According to the invention of claim 5, in the method according to claim 3 or 4, the heading process for the head section and the countersinking process are carried out while applying ultrasonic vibrations to the forgeable wire rod, the upper die, and the lower die, or alternatively the forgeable wire rod, the upper die, or the lower die.

According to the invention of claim 6, in the method according to any one of claims 3 to 5, the heading process for the head section and the countersinking process are carried out under a state in which a clearance is generated between the upper die and the lower die so as to serve as a relief position for the forgeable wire rod on a lower side of the cylindrical skirt portion during the heading process for the head section and the countersinking process.

According to the invention of claim 7, the method according to any one of claims 3 to 6 further includes carrying out a heat treatment step after a step of carrying out process finishing for removing the excess portion.

According to the invention of claim 8, the method according to claim 7 further includes carrying out a surface treatment step after the heat treatment step.

According to the invention of claim 9, there is provided a method of manufacturing a locking bolt,
the locking bolt including:
a shank section threaded on an outer circumference thereof; and
a head section provided at one end of the shank section,
the head section including:
a main body portion having a hexagonal cross-sectional shape; and
a cylindrical skirt portion provided continuously with the main body portion and formed so as to be spaced radially outward from the main body portion in an expanding manner along a concave surface using a catenary curve surface,
the locking bolt having a structure in which:
a lower edge surface of an outer surface of the cylindrical skirt portion is parallel to an axis of the main body portion; and
an inner surface of the cylindrical skirt portion is hollowed into a substantially inverted catenary curve surface-like shape as a whole and a polyhedron-like shape having six or more corners in a circumferential direction with a flat portion left on a bottom rim, and
an intersection between the inner surface of the cylindrical skirt portion and the shank section being formed into an approximately-round shape, to thereby have roundness,
the method including:
using a header including:
a cut-off knife;
an upper die including a punch; and
a lower die including a countersinking die block fitted thereto in a mountable and demountable manner, for carrying out a countersinking process to hollow the inner surface of the cylindrical skirt portion into the substantially inverted catenary curve surface-like shape as a whole and the polyhedron-like shape having six or more corners in the circumferential direction;

cutting off a forgeable wire rod into a predetermined length by the cut-off knife, and subsequently carrying out, on the cut off forgeable wire rod, a heading process for the head section and the countersinking process by the upper die and the lower die so as to form, at one end of the forgeable wire rod, the head section including the main body portion and the cylindrical skirt portion, which is provided continuously with the main body portion and formed so as to be spaced radially outward from the main body portion in the expanding manner along the concave surface using the catenary curve surface, to thereby provide the structure in which the inner surface of the cylindrical skirt portion is hollowed into the substantially inverted catenary curve surface-like shape as a whole and the polyhedron-like shape having six or more corners in the circumferential direction with the flat portion left on the bottom rim;

subsequently processing the main body portion of the head section into the hexagonal cross-sectional shape through use of an automatic trimming machine;

subsequently threading an outer circumference of the forgeable wire rod in a portion other than the head section through a rolling process so as to form the shank section; and subsequently removing an excess portion so that the lower edge surface of the outer surface of the cylindrical skirt portion becomes parallel to the axis of the main body portion.

According to the invention of claim 10, in the method according to claim 9, the countersinking die block has a horizontally symmetrical shape in which countersinking shoulder-like portions for carrying out the countersinking process are provided at an upper end and a lower end of the countersinking die block, and when one of the countersinking shoulder-like portions is worn, the countersinking die block is inverted for further use.

According to the invention of claim 11, in the method according to claim 9 or 10, the heading process for the head section and the countersinking process are carried out while applying ultrasonic vibrations to the forgeable wire rod, the upper die, and the lower die, or alternatively the forgeable wire rod, the upper die, or the lower die.

According to the invention of claim 12, in the method according to any one of claims 9 to 11, the heading process for the head section and the countersinking process are carried out under a state in which a clearance is generated between the upper die and the lower die so as to serve as a relief position for the forgeable wire rod on a lower side of the cylindrical skirt portion during the heading process for the head section and the countersinking process.

According to the invention of claim 13, the method according to any one of claims 9 to 12 further includes carrying out a heat treatment step after a step of carrying out process finishing for removing the excess portion.

According to the invention of claim 14, the method according to claim 13 further includes carrying out a surface treatment step after the heat treatment step.

Advantageous Effects of Invention

According to the present invention, it is possible to provide the locking bolt capable of tightly fixing the member or the like at an extremely high degree of firmness without being loosened even when vibrations are repeatedly applied thereto.

Further, with the method according to the present invention, it is possible to efficiently manufacture, through use of the header, the locking bolt capable of tightly fixing the member or the like at an extremely high degree of firmness without being loosened even when vibrations are repeatedly applied thereto.

Besides, the method according to the present invention facilitates the manufacture without involving the cutting work or the like that requires great skill.

DESCRIPTION OF EMBODIMENTS

According to a first aspect of the present invention, there is provided a locking bolt, including:
 a shank section threaded on an outer circumference thereof; and
 a head section provided at one end of the shank section,
 in which the head section includes:
  a main body portion having a hexagonal cross-sectional shape; and
  a cylindrical skirt portion provided continuously with the main body portion and formed so as to be spaced radially outward from the main body portion in an expanding manner along a concave surface using a catenary curve surface,
 in which the locking bolt has a structure in which:
  a lower edge surface of an outer surface of the cylindrical skirt portion is parallel to an axis of the main body portion; and an inner surface of the cylindrical skirt portion is hollowed into an inverted catenary curve surface-like shape with a flat portion left on a bottom rim, and in which an intersection between the inner surface of the cylindrical skirt portion and the shank section is formed into an approximately-round shape, to thereby have roundness.

Now, the first aspect of the present invention is described in detail with reference to the drawings.

Figure 1:
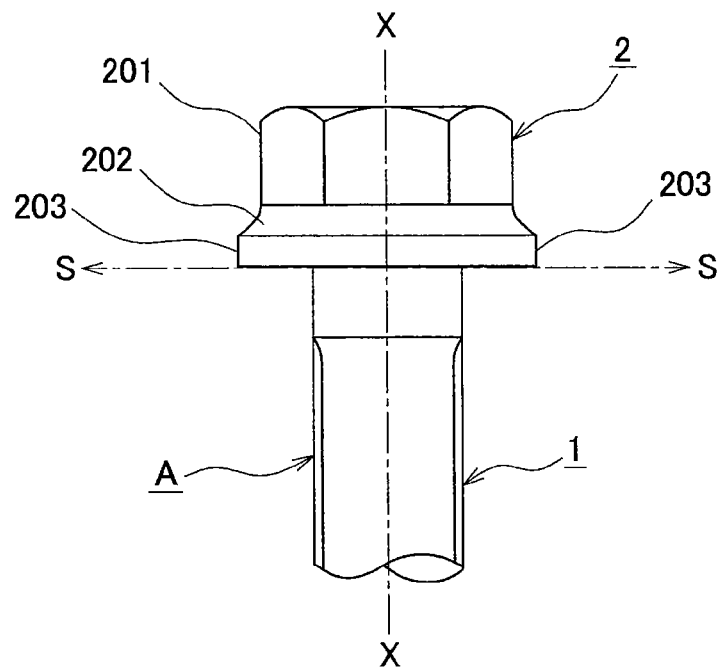
FIG. 1 is a front view illustrating a locking bolt according to one aspect of the present invention (hereinafter sometimes referred to as "locking bolt according to a first aspect of the present invention").
Figure 2:
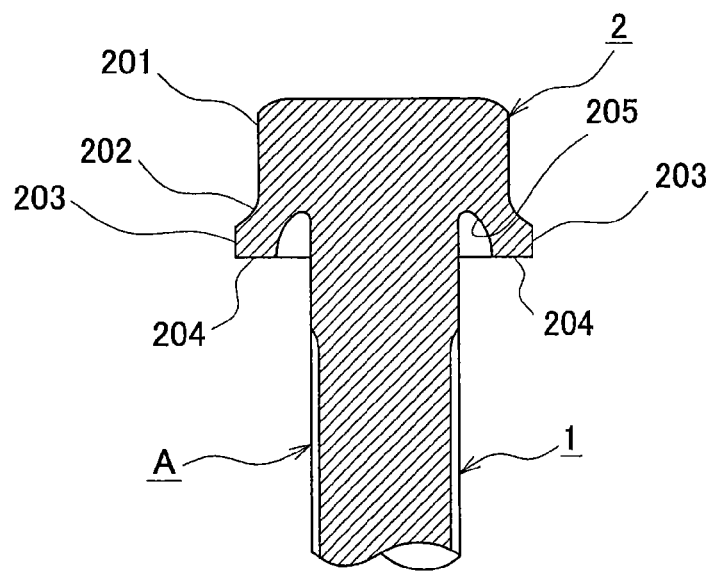
FIG. 2 is an explanatory sectional view illustrating the locking bolt according to one aspect of the present invention.

FIG. 1 is a front view illustrating a locking bolt according to one aspect of the present invention (that is, "locking bolt according to the first aspect of the present invention"). FIG. 2 is an explanatory sectional view thereof.

Figure 3:
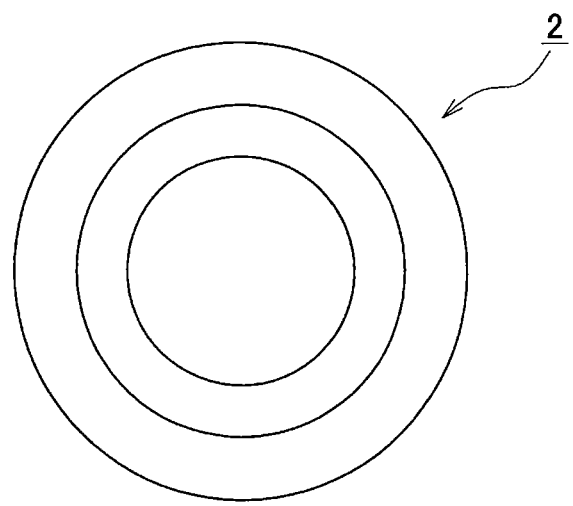
FIG. 3 is an explanatory bottom view from the line S-S of FIG. 1, for illustrating a shape of the locking bolt according to one aspect of the present invention.

FIG. 3 is an explanatory bottom view from the line S-S of FIG. 1, for illustrating a shape of the locking bolt according to the first aspect of the present invention.

Figure 4:
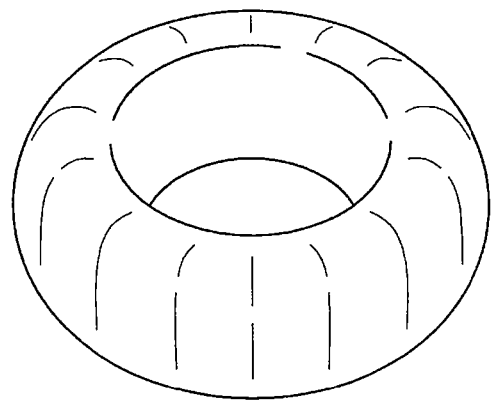
FIG. 4 is an explanatory view illustrating a shape of an inner surface of a hollowed skirt portion (inverted catenary curve surface-like shape) of the locking bolt according to one aspect of the present invention.

Further, FIG. 4 is an explanatory view illustrating a shape of an inner surface of a hollowed skirt portion (inverted catenary curve surface-like shape) of the locking bolt according to the first aspect of the present invention.

A locking bolt A according to the first aspect of the present invention includes a shank section 1 threaded on an outer circumference thereof, and a head section 2 provided at one end of the shank section 1. The head section 2 includes a main body portion 201 having a hexagonal cross-sectional shape, and a cylindrical skirt portion 202 provided continuously with the main body portion 201 and formed so as to be spaced radially outward from the main body portion 201 in an expanding manner along a concave surface using a catenary curve surface. The locking bolt A has a structure in which a lower edge surface 203 of an outer surface of the skirt portion 202 is parallel to an axis of the main body portion 201 and an inner surface of the skirt portion 202 is hollowed into an inverted catenary curve surface-like shape with a flat portion left on a bottom rim 204. Further, an intersection between the inner surface of the skirt portion 202 and the shank section 1 is formed into an approximately-round shape, to thereby have roundness.

[Structure of Locking Bolt According to First Aspect of Present Invention]

The locking bolt A according to the first aspect of the present invention includes the shank section 1 threaded on the outer circumference thereof, and the head section 2 provided at one end of the shank section 1. Therefore, the locking bolt A is similar to general bolts in that the bolt includes the shank section and the head section, but the head section 2 has a special structure to obtain a locking effect.

That is, the head section 2 of the locking bolt A manufactured in the present invention includes the main body portion 201 having the hexagonal cross-sectional shape, and the cylindrical skirt portion 202 provided continuously with the main body portion 201 and formed so as to be spaced radially outward from the main body portion 201 in the expanding manner along the concave surface using the catenary curve surface.

In this case, the main body portion 201 has a hexagonal cross-sectional shape similarly to the head section of general bolts.

On the other hand, the skirt portion 202 is a cylindrical portion that is substantially shaped like a skirt, and is provided continuously with the main body portion 201 and formed so as to be spaced radially outward from the main body portion 201.

Besides, the skirt portion 202 is formed in the expanding manner along the concave surface using the catenary curve surface (that is, in the explanatory sectional view of FIG. 2, opposing surfaces are inclined symmetrically to open into a slope-like shape).

More exactly, the skirt portion 202 (or the outer surface thereof) is formed in the expanding manner along the concave surface using a part of the catenary curve surface (catenary surface; catenoid) instead of using the entire catenary curve surface. In sectional view, the skirt portion 202 is formed in the expanding manner along a catenary curve (catenary line; catenary curve line).

Note that, the catenary curve (also referred to as "catenary line" or "catenary curve line") refers to a shape defined by suspending a chain, a rope, or the like with its ends fixed (hanging a chain, a rope, or the like by hands). The catenary curve surface (also referred to as "catenary surface" or "catenoid") refers to a curve surface defined by rotating the catenary curve (catenary line; catenary curve line).

In this manner, the outer surface of the skirt portion 202 is formed in the expanding manner along the concave surface using the catenary curve surface. Through the formation of the outer surface of the skirt portion 202 in this manner, elasticity is imparted to this portion, with the result that a member or the like can be fixed tightly with a sufficient tightening force, and an anti-loosening state can be achieved after the tightening.

Note that, the outer surface of the skirt portion 202 may be formed into a spline curve-like shape as well as the shape using the catenary curve surface.

However, the lower edge surface 203 of the outer surface of the skirt portion 202 is parallel to a direction of an axis X-X of the main body portion 201. Thus, even when the locking bolt is quenched with an iron-based material, there is no fracture (crack) generated in a distal end portion of the skirt portion 202 that is formed in the expanding manner.

The inner surface of the skirt portion 202 is hollowed so that the hollowed portion has the inverted catenary curve surface-like shape. Thus, the locking bolt A has a structure in which the inner surface of the skirt portion 202 is hollowed into the "inverted catenary curve surface-like shape" with the flat portion (serving as a seating surface) left on the bottom rim 204.

In this case, the reason why the shape is represented as the "inverted" catenary curve surface-like shape is because the hollowed structure has a shape defined by turning the "catenary curve surface" (catenary surface; catenoid) upside down. Further, the reason why the shape is represented as the inverted catenary curve surface-"like" shape is because, as is apparent from FIGS. 1 to 4, the shape is not the inverted catenary curve surface itself but is approximate thereto.

Note that, the locking bolt A may have a structure in which the inner surface of the skirt portion 202 is hollowed into a spline curve-like shape (spline curve surface-like shape) as well as the structure in which the inner surface is hollowed into the inverted catenary curve surface-like shape.

The diameter of the shank section 1 may be set to an appropriate dimension as necessary. For example, the diameter of the shank section 1 may be as small as 3 mm, and may be as large as approximately 36 mm. However, the diameter of the shank section 1 is not limited thereto.

The locking bolt A according to the first aspect of the present invention has the structure in which the inner surface of the skirt portion 202 is hollowed into the inverted catenary curve surface-like shape. In addition, it is preferred that the root of the skirt portion 202 that is connected to the shank, that is, an intersection (groove portion) 205 between the inner surface of the skirt portion 202 and the shank section 1 have some roundness instead of minimizing the roundness (instead of having sharpness). That is, it is preferred that the leading end at the intersection between the inner surface of the skirt portion 202 and the shank section 1 have an approximately-round shape (round shape) having roundness. It is moderate that the radius (R) of this portion be approximately more than 1 mm and 1.5 mm or less. In this case, when the root of the skirt portion 202 that is connected to the shank, that is, the intersection (groove portion) 205 between the inner surface of the skirt portion 202 and the shank section 1 is sharp so that the leading end has a wedge shape, absorption due to the elasticity is significant, but compressive stress concentrates at the leading end and then at the rim of the seating surface on an inner circle side. Therefore, the locking bolt A cannot withstand this state, with the result of incomplete fixation on the seating surface even through application of torque, and is loosened along with the elapse of time.

Next, a second aspect of the present invention is described in detail with reference to the drawings.

Figure 5:
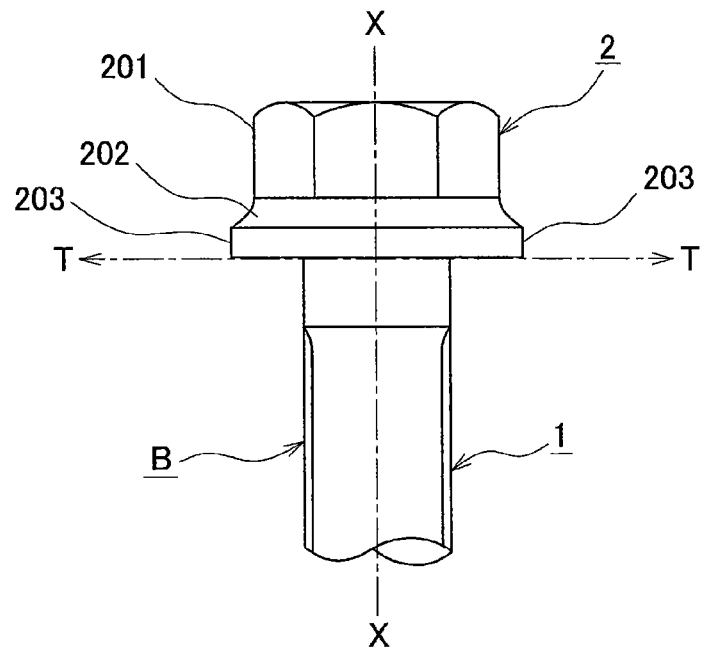
FIG. 5 is a front view illustrating a locking bolt according to another aspect of the present invention (hereinafter sometimes referred to as "locking bolt according to a second aspect of the present invention").

FIG. 5 is a front view illustrating a locking bolt according to another aspect of the present invention (that is, "locking bolt according to the second aspect of the present invention").

Figure 6:
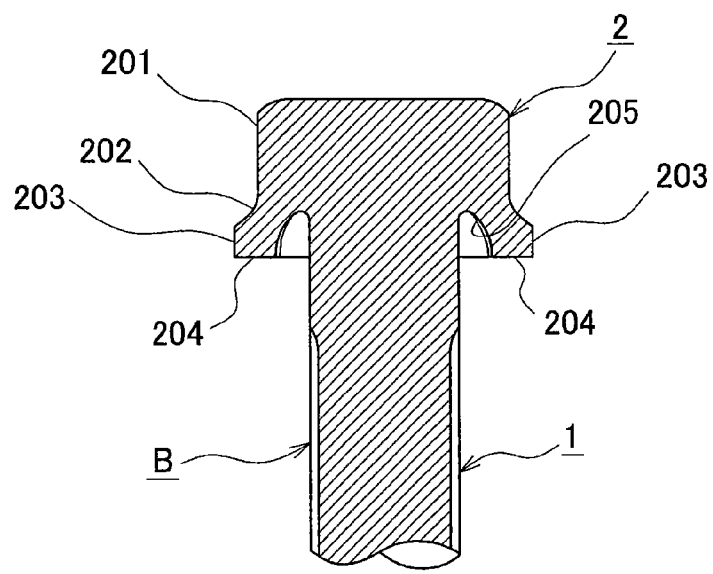
FIG. 6 is an explanatory sectional view illustrating the locking bolt according to another aspect of the present invention.

FIG. 6 is an explanatory sectional view illustrating the locking bolt according to the second aspect of the present invention.

Figure 7:
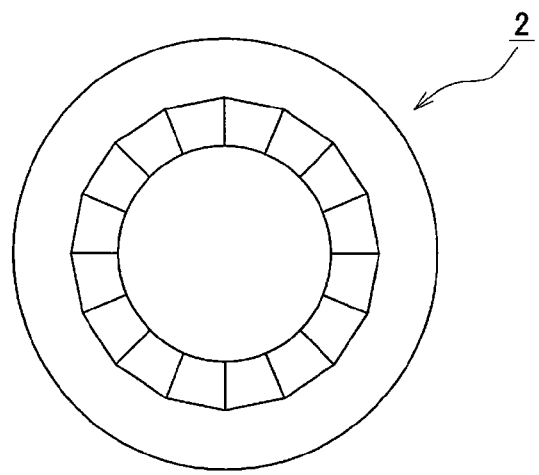
FIG. 7 is an explanatory bottom view from the line T-T of FIG. 5, for illustrating a shape of the locking bolt according to another aspect of the present invention.

FIG. 7 is an explanatory bottom view from the line T-T of FIG. 5, for illustrating a shape of the locking bolt according to the second aspect of the present invention.

Figure 8:
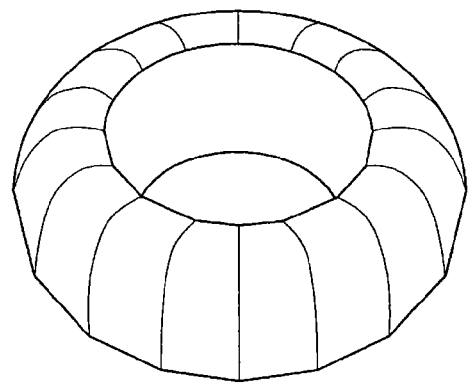
FIG. 8 is an explanatory view illustrating a shape of an inner surface of a hollowed skirt portion (inverted catenary curve surface-like shape as a whole and polyhedron-like shape having six or more corners in a circumferential direction) of the locking bolt according to another aspect of the present invention.

FIG. 8 is an explanatory view illustrating a shape of an inner surface of a hollowed skirt portion (substantially inverted catenary curve surface-like shape as a whole and polyhedron-like shape having six or more corners in a circumferential direction) of the locking bolt according to the second aspect of the present invention.

A locking bolt B according to the second aspect of the present invention includes a shank section 1 threaded on an outer circumference thereof, and a head section 2 provided at one end of the shank section 1. The head section 2 includes a main body portion 201 having a hexagonal cross-sectional shape, and a cylindrical skirt portion 202 provided continuously with the main body portion 201 and formed so as to be spaced radially outward from the main body portion 201 in an expanding manner along a concave surface using a catenary curve surface. The locking bolt B has a structure in which a lower edge surface 203 of an outer surface of the skirt portion 202 is parallel to an axis of the main body portion 201 and an inner surface of the skirt portion 202 is hollowed into a substantially inverted catenary curve surface-like shape as a whole and a polyhedron-like shape having six or more corners in the circumferential direction with a flat portion left on a bottom rim 204. Further, an intersection between the inner surface of the skirt portion 202 and the shank section 1 is formed into an approximately-round shape, to thereby have roundness.

The locking bolt B according to the second aspect of the present invention is similar to the above-mentioned locking bolt A according to the first aspect of the present invention except for a difference in the shape of the hollowed inner surface of the skirt portion 202.

That is, the above-mentioned locking bolt A according to the first aspect of the present invention has the structure in which the inner surface of the skirt portion 202 is hollowed into the inverted catenary curve surface-like shape with the flat portion left on the bottom rim 204. On the other hand, the locking bolt B according to the second aspect of the present invention has the structure in which the inner surface of the skirt portion 202 is hollowed into the substantially inverted catenary curve surface-like shape as a whole and the polyhedron-like shape having six or more corners in the circumferential direction (approximately into an assembly of objects having a strip shape) with the flat portion left on the bottom rim 204.

In this case, the reason why the shape is represented as the "substantially inverted catenary curve surface-like shape as a whole" is because the locking bolt B according to the second aspect of the present invention has the structure in which the inner surface of the skirt portion 202 appears to be hollowed into the "substantially inverted catenary curve surface-like shape as a whole," but exactly, the inner surface is not necessarily hollowed into the curve surface-like shape as seen in the circumferential direction although the inner surface is hollowed into the inverted catenary curve surface-like shape as seen in the direction of the axis X-X, and as illustrated in FIG. 8, the inner surface is hollowed into the polyhedron-like shape having six or more corners in the circumferential direction (preferably 16 to 20 corners, and 16 corners in FIG. 8). The "circumferential direction" herein refers to a direction approximately perpendicular to the axis instead of referring to the direction of the axis.

Note that, similarly to the above-mentioned locking bolt A according to the first aspect of the present invention, the outer surface of the skirt portion 202 of the locking bolt B according to the second aspect of the present invention may be formed into a spline curve-like shape as well as the shape using the catenary curve surface.

Further, similarly to the above-mentioned locking bolt A according to the first aspect of the present invention, the locking bolt B according to the second aspect of the present invention may have a structure in which the inner surface of the skirt portion 202 is hollowed into a substantially spline curve-like shape as a whole and a polyhedron-like shape having six or more corners in the circumferential direction.

Also in the locking bolt B according to the second aspect of the present invention, it is preferred that the root of the skirt portion 202 that is connected to the shank, that is, the intersection (groove portion) 205 between the inner surface of the skirt portion 202 and the shank section 1 have, unexpectedly contrary to expectation, some roundness instead of minimizing the roundness (instead of having sharpness). That is, it is preferred that the leading end at the intersection between the inner surface of the skirt portion 202 and the shank section 1 have an approximately-round shape (round shape) having roundness. It is moderate that the radius (R) of this portion be approximately 1 mm or more and 2 mm or less (1R to 2R).

There are provided methods of manufacturing the first locking bolt and the second locking bolt according to the present invention having the above-mentioned structures, respectively, through use of a header. That is, there are provided a first method according to the present invention and a second method according to the present invention.

Note that, instead of manufacturing the locking bolt through use of the header, the shape of a countersinking die block may be changed to manufacture the locking bolt through cold forging or hot forging.

Now, the method of manufacturing the first locking bolt according to the present invention (first method according to the present invention) and the method of manufacturing the second locking bolt according to the present invention (second method according to the present invention) are described with reference to the drawings.

In this case, the first method according to the present invention and the second method according to the present invention may be basically carried out in the same manner except that the shape of the countersinking die block to be used is different from each other and that the shape of the hollowed portion of the inner surface of the skirt portion in the locking bolt to be obtained is thus different from each other. Therefore, common matters are described in a collective manner below.

That is, the first method of the present invention is a method of manufacturing a locking bolt,
the locking bolt including:
a shank section threaded on an outer circumference thereof; and
a head section provided at one end of the shank section,
the head section including:
a main body portion having a hexagonal cross-sectional shape; and
a cylindrical skirt portion provided continuously with the main body portion and formed so as to be spaced radially outward from the main body portion in an expanding manner along a concave surface using a catenary curve surface,
the locking bolt having a structure in which:
a lower edge surface of an outer surface of the cylindrical skirt portion is parallel to an axis of the main body portion; and
an inner surface of the cylindrical skirt portion is hollowed into an inverted catenary curve surface-like shape with a flat portion left on a bottom rim, and
an intersection between the inner surface of the cylindrical skirt portion and the shank section being formed into an approximately-round shape, to thereby have roundness,
the method including:
using a header including:
a cut-off knife;
an upper die including a punch; and
a lower die including a countersinking die block fitted thereto in a mountable and demountable manner, for carrying out a countersinking process to hollow the inner surface of the cylindrical skirt portion into the inverted catenary curve surface-like shape;
cutting off a forgeable wire rod into a predetermined length by the cut-off knife, and subsequently carrying out, on the cut off forgeable wire rod, a heading process for the head section and the countersinking process by the upper die and the lower die so as to form, at one end of the forgeable wire rod, the head section including the main body portion and the cylindrical skirt portion, which is provided continuously with the main body portion and formed so as to be spaced radially outward from the main body portion in the expanding manner along the concave surface using the catenary curve surface, to thereby provide the structure in which the inner surface of the cylindrical skirt portion is hollowed into the inverted catenary curve surface-like shape with the flat portion left on the bottom rim;
subsequently processing the main body portion of the head section into the hexagonal cross-sectional shape through use of an automatic trimming machine;
subsequently threading an outer circumference of the forgeable wire rod in a portion other than the head section through a rolling process so as to form the shank section; and
subsequently removing an excess portion so that the lower edge surface of the outer surface of the cylindrical skirt portion becomes parallel to the axis of the main body portion.

Further, the second method of the present invention is a method of manufacturing a locking bolt,
the locking bolt including:
a shank section threaded on an outer circumference thereof; and
a head section provided at one end of the shank section,
the head section including:
a main body portion having a hexagonal cross-sectional shape; and
a cylindrical skirt portion provided continuously with the main body portion and formed so as to be spaced radially outward from the main body portion in an expanding manner along a concave surface using a catenary curve surface,
the locking bolt having a structure in which:
a lower edge surface of an outer surface of the cylindrical skirt portion is parallel to an axis of the main body portion; and
an inner surface of the cylindrical skirt portion is hollowed into a substantially inverted catenary curve surface-like shape as a whole and a polyhedron-like shape having six or more corners in a circumferential direction with a flat portion left on a bottom rim, and
an intersection between the inner surface of the cylindrical skirt portion and the shank section being formed into an approximately-round shape, to thereby have roundness,
the method including:
using a header including:
a cut-off knife;
an upper die including a punch; and
a lower die including a countersinking die block fitted thereto in a mountable and demountable manner, for carrying out a countersinking process to hollow the inner surface of the cylindrical skirt portion into the substantially inverted catenary curve surface-like shape as a whole and the polyhedron-like shape having six or more corners in the circumferential direction;
cutting off a forgeable wire rod into a predetermined length by the cut-off knife, and subsequently carrying out, on the cut off forgeable wire rod, a heading process for the head section and the countersinking process by the upper die and the lower die so as to form, at one end of the forgeable wire rod, the head section including the main body portion and the cylindrical skirt portion, which is provided continuously with the main body portion and formed so as to be spaced radially outward from the main body portion in the expanding manner along the concave surface using the catenary curve surface, to thereby provide the structure in which the inner surface of the cylindrical skirt portion is hollowed into the substantially inverted catenary curve surface-like shape as a whole and the polyhedron-like shape having six or more corners in the circumferential direction with the flat portion left on the bottom rim;
subsequently processing the main body portion of the head section into the hexagonal cross-sectional shape through use of an automatic trimming machine;
subsequently threading an outer circumference of the forgeable wire rod in a portion other than the head section through a rolling process so as to form the shank section; and
subsequently removing an excess portion so that the lower edge surface of the outer surface of the cylindrical skirt portion becomes parallel to the axis of the main body portion.

In the methods according to the present invention (first method and second method), a heading process for the head section and a countersinking process are carried out through use of a header including a cut-off knife, an upper die including a press punch, and a lower die including a countersinking die block fitted thereto in a mountable and demountable manner, for carrying out the countersinking process to hollow the inner surface of the skirt portion.

The header (also referred to as "cold header") herein refers to a machine for forming a head of a screw through cold work. Depending on the number of processing stages, the header ranges in type from a single stage (single header) to multiple stages. In general, a double-stage type or a triple-stage type is used.

Note that, description of the header is also given as appropriate in a part for describing the steps of the manufacturing method.

Figure 9:
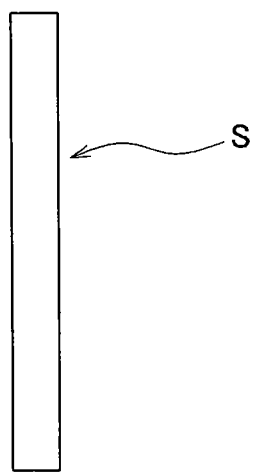
FIG. 9 is a front view illustrating a wire rod to be used in a method according to one aspect of the present invention.

In the methods according to the present invention (first method and second method), a forgeable "wire rod," in other words, a solid and round bar blank made of a metal material is used, preferably a steel product having a circular shape in cross section. FIG. 9 is a front view illustrating a wire rod S according to one aspect of the present invention. As the wire rod, there may be used a material that is not subjected to heat treatment.

Examples of the steel product to be used include steel, and depending on the application, an alloy including nickel, chromium, molybdenum, cobalt, tungsten, and Other metals, for example, stainless steel, nickel-chromium steel, and chromium-molybdenum steel. In addition, a non-ferrous metal material may also be used depending on the application.

Now, the methods according to the present invention (first method and second method) are described in an order of steps thereof.

[Cut-off Step]

The first step is a cut-off step.

The cut-off step is a step of cutting off an elongated wire rod into a predetermined length with the cut-off knife called "shear knife" or the like.

The header generally includes the cut-off knife described above, and this cut-off knife may also be used in the present invention. The cut-off step, the subsequent heading process for the head section, and the subsequent countersinking process are carried out by the header.

Figure 10:
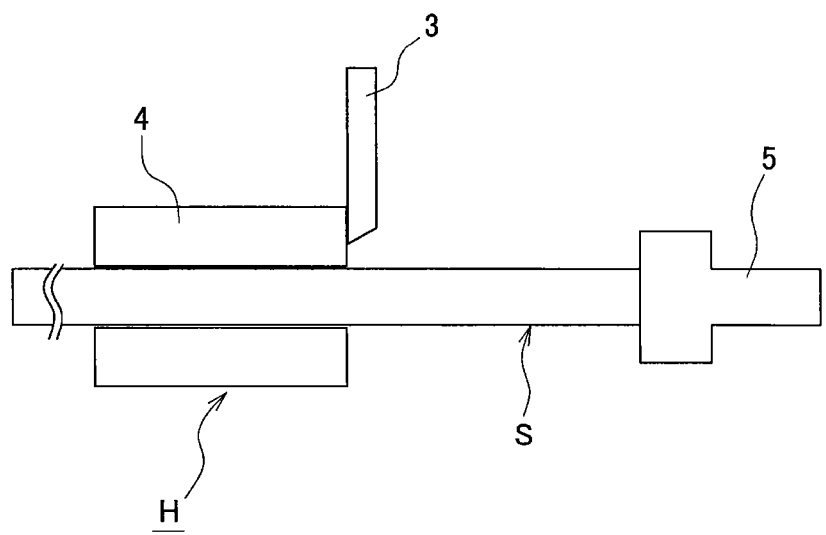
FIG. 10 is an explanatory view illustrating a cut-off step of the method according to the present invention and an example of a header to be used in this cut-off step.

FIG. 10 illustrates the cut-off step and an example of the header to be used in this cut-off step.

Note that, examples of the header include a horizontal type and a vertical type, and any of those types is applicable. FIG. 10 illustrates the vertical type.

In FIG. 10, reference symbol 3 represents a cut-off knife; reference symbol 4, a quill; and reference symbol 5, a stopper. The quill herein refers to a cylindrical feed base for moving the wire rod in an axial direction while supporting the wire rod.

In this cut-off step, specifically, for example, the wire rod S supported by the quill 4 is fed into a header H by a feed roller (not shown). When the elongated wire rod S is fed to the stopper 5, the elongated wire rod S is cutoff (sheared) into a predetermined length by the cut-off knife 3.

The header H used in the methods according to the present invention (first method and second method) includes the cut-off knife 3 described above, as well as includes an upper die including a press punch, and a lower die including a countersinking die block fitted thereto in a mountable and demountable manner, for carrying out the countersinking process to hollow the inner surface of the skirt portion.

The subsequent heading process for the head section and the subsequent countersinking process are carried out by the upper die and the lower die mounted to the header H.

[Step of Carrying Out Heading Process for Head Section and Countersinking Process]

The subsequent step is a step of carrying out the heading process for the head section and the countersinking process.

That is, the wire rod S cut off in the cut-off step as described above is conveyed to the center of the header H, and then the wire rod S thus cut off is subjected to the heading process for the head section and the countersinking process by the upper die and the lower die, to thereby obtain a structure in which a head section including a main body portion and a skirt portion is formed at one end of the wire rod, the skirt portion is provided continuously with the main body portion and formed so as to be spaced radially outward from the main body portion in an expanding manner along a concave surface using a catenary curve surface, and the inner surface of the skirt portion is hollowed by the countersinking die block with a flat portion left on a bottom rim. At this time, an intersection between the inner surface of the skirt portion and the shank section is formed into an approximately-round shape at the same time, to thereby have roundness.

In this case, the first method according to the present invention provides a structure in which the inner surface of the skirt portion is hollowed by the countersinking die block into an inverted catenary curve surface-like shape. On the other hand, the second method according to the present invention provides a structure in which the inner surface of the skirt portion is hollowed by the countersinking die block into a substantially inverted catenary curve surface-like shape as a whole and a polyhedron-like shape having six or more corners in the circumferential direction.

The shape of the countersinking die block to be used in each of the first method according to the present invention and the second method according to the present invention is described later.

Figure 11:
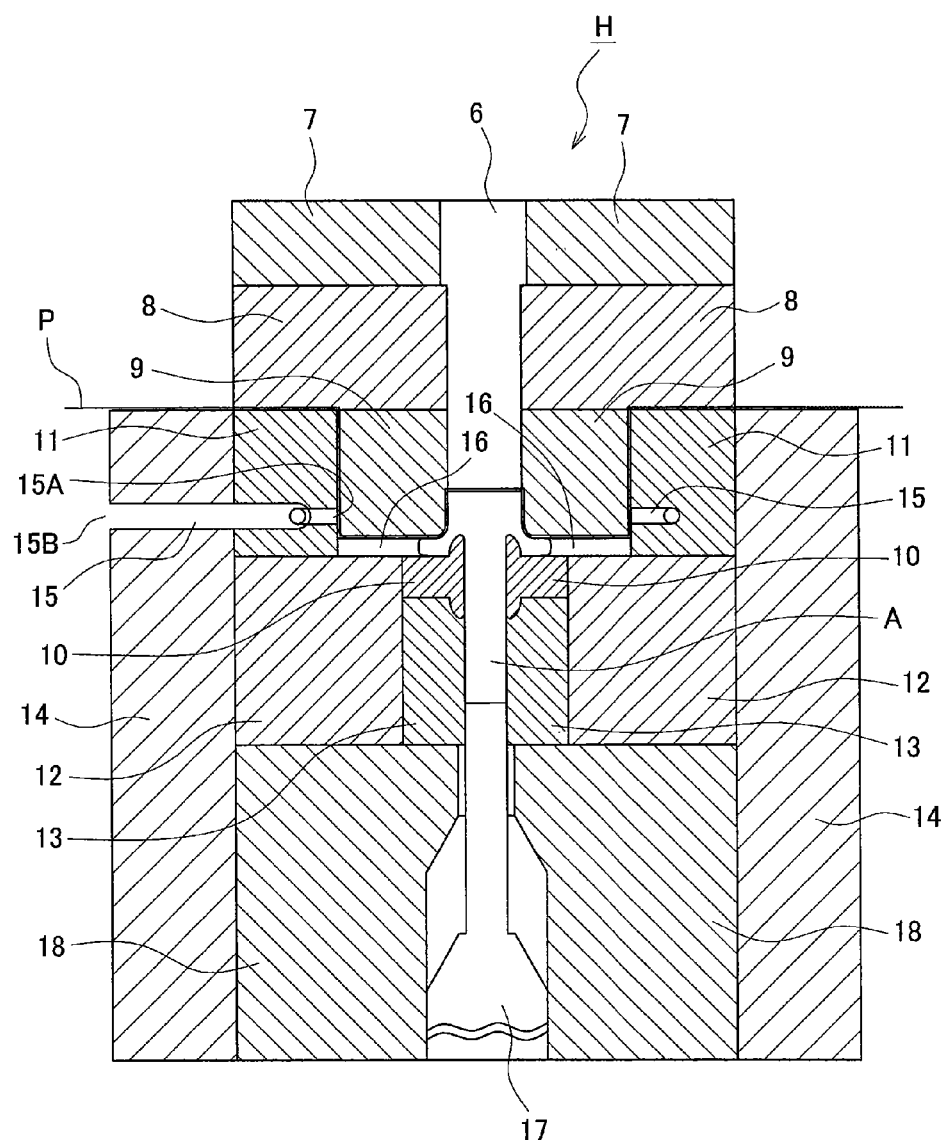
FIG. 11 is an explanatory view illustrating a situation where a heading process for a head section and a countersinking process are carried out through use of the header in the method according to the present invention.

FIG. 11 is an explanatory view illustrating a situation where the heading process for the head section and the countersinking process are carried out through use of the header H.

Figure 12:
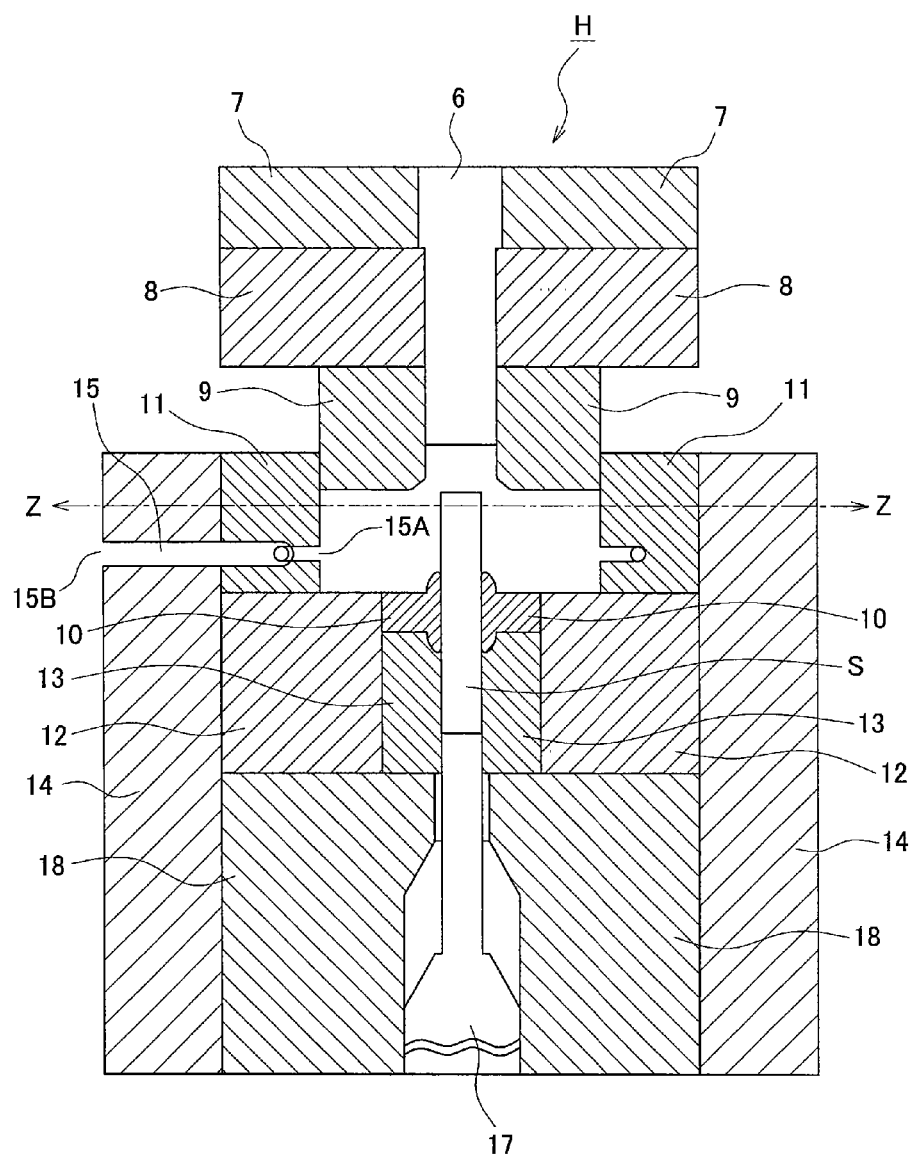
FIG. 12 is an explanatory view illustrating a situation immediately before the heading process for the head section and the countersinking process are carried out through use of the header in the method according to the present invention.

Further, FIG. 12 is an explanatory view illustrating a situation immediately before the heading process for the head section and the countersinking process are carried out through use of the header H. At this time, the heading process for the head section and the countersinking process are carried out while applying ultrasonic vibrations to the wire rod and/or the die, that is, both of the wire rod and the die, or alternatively the wire rod or the die.

Figure 13:
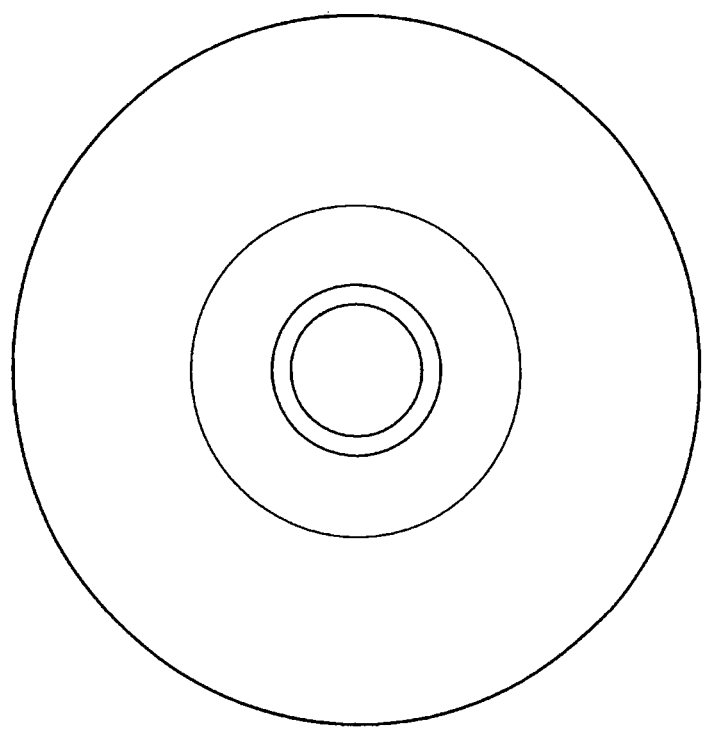
FIG. 13 is a schematic explanatory bottom view illustrating an upper die at the time when a forging process for the head section and the countersinking process are carried out in the method according to the present invention.
Figure 14:
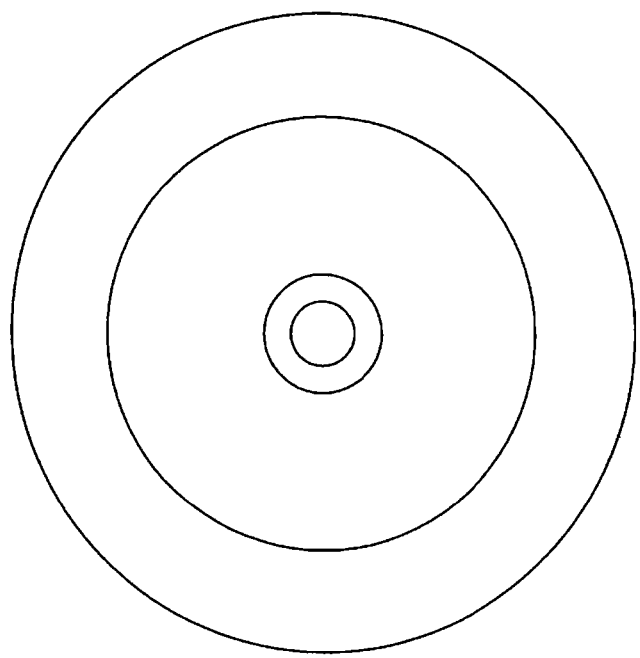
FIG. 14 is a schematic explanatory top view illustrating a lower die at the time when the forging process for the head section and the countersinking process are carried out in the method according to the present invention.

Further, FIG. 13 is a schematic explanatory bottom view (bottom view from the vicinity of the position of the line Z-Z of FIG. 12) illustrating the upper die at this time. FIG. 14 is a schematic explanatory top view (top view from the vicinity of the position of the line Z-Z of FIG. 12) illustrating the lower die at this time.

The upper die is described. In FIGS. 11 and 12, reference symbol 6 represents a press punch. Reference symbol 7 represents an upper press punch guide; reference symbol 8, a middle press punch guide; and reference symbol 9, a lower press punch guide. The lower press punch guides 9 are made of an ultra-hard metal. Those components are configured to move on a ram side (upper side in FIGS. 11 and 12). Note that, depending on molding conditions, the press punch may be configured to press in multiple stages.

Next, the lower die is described. First, reference symbol 10 represents a countersinking die block. Reference symbol 11 represents a lower punch guide; reference symbol 12, a block guide; reference symbol 13, a block receiving guide; and reference symbol 14, an inner die guide. Further, reference symbol 15 represents a fluid channel serving as a channel for a demolding agent and cooling water during the molding process. Reference symbol 16 represents a clearance provided between the upper die and the lower die.

Further, reference symbol 17 represents a push-out pin for pushing out a molded product after the end of the step of carrying out the forging process for the head section and the countersinking process; and reference symbol 18, a push-out pin guide.

Note that, reference symbol P represents a parting line (die matching plane, or die partition line).

The surface of the die at a portion to be worn due to sliding is subjected to surface treatment as necessary in advance to have wear resistance. Further, the die has a portion that is partially made of an ultra-hard material (ultra-hard metal).

In the first method according to the present invention, in the step of carrying out the forging process for the head section and the countersinking process, the forging process for the head section and the countersinking process are carried out through use of the header including the upper die including the press punch 6, and the lower die including the countersinking die block 10 fitted thereto in a mountable and demountable manner, for carrying out the countersinking process to hollow the inner surface of the skirt portion into the inverted catenary curve surface-like shape. Through this step, the contour of the locking bolt is substantially determined.

Figure 15:
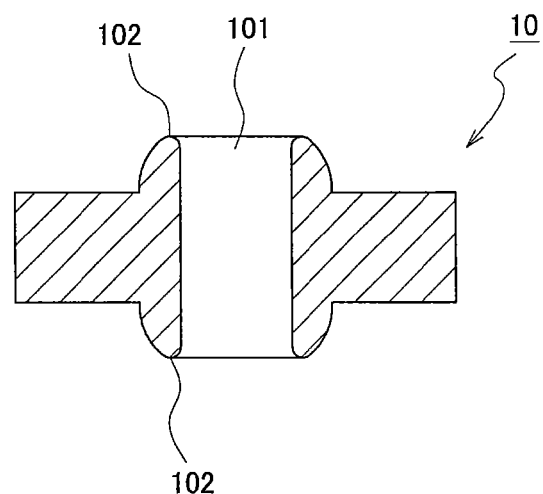
FIG. 15 is an explanatory sectional view illustrating an example of a countersinking die block to be used in a first method according to the present invention.
Figure 16:
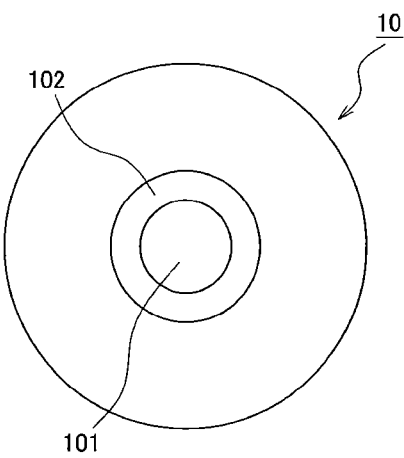
FIG. 16 is a plan view illustrating the example of the countersinking die block to be used in the first method according to the present invention.

In the first method according to the present invention, as illustrated in FIGS. 15 and 16, the countersinking die block 10 has a substantially disc-like shape as a whole, and has a hollow structure with a void 101 formed at a center portion thereof. Besides, countersinking shoulder-like portions 102 are formed around the void 101 in a raised manner.

The countersinking shoulder-like portions 102 have an inverted catenary curve surface-like shape.

That is, the countersinking die block 10 has a horizontally symmetrical shape in which the countersinking shoulder-like portions 102 for carrying out the countersinking process are provided at upper and lower ends around the void 101 formed at the center portion. When one of the countersinking shoulder-like portions 102 is worn or chipped, the countersinking die block 10 is inverted for further use. When another of the countersinking shoulder-like portions 102 is also worn or chipped after inverting for further use, the countersinking die block 10 is replaced with a new one.

The countersinking process herein refers to a process of hollowing the inner surface of the skirt portion 202 (in the first aspect of the present invention, a process of hollowing the inner surface of the skirt portion 202 into the inverted catenary curve surface-like shape). The countersinking process is carried out through use of the countersinking die block 10 (in particular, through use of the countersinking shoulder-like portion 102 thereof).

As a matter of course, the surface of the countersinking die block 10, which serves as a sliding surface, is subjected to surface treatment in advance to have wear resistance. Further, in order to prevent a fracture, a crack, or the like, the surface of the countersinking die block 10 is subjected to surface treatment different from general surface treatment for a sliding surface, or the countersinking die block 10 is made of a different material and subjected to heat treatment.

It is desired that the life of the countersinking die block 10 be prolonged to the extent possible. In addition, from the viewpoint of carrying out an accurate countersinking process, it is more necessary that the countersinking process be carried out under a state in which the surface of the countersinking die block 10 is not damaged (under a state in which no fracture, crack, or the like is generated). Therefore, the countersinking die block 10 is made of a tough material, which is less liable to generate a fracture, a crack, or the like, rather than an ultra-hard material, which is less liable to cause wear. That is, there is used a material having such property that a crack is hardly generated and propagated during use. As an alternative measure, when the countersinking die block 10 is worn, the countersinking die block 10 may be inverted for further use, or may be replaced with a new one.

Figure 17:
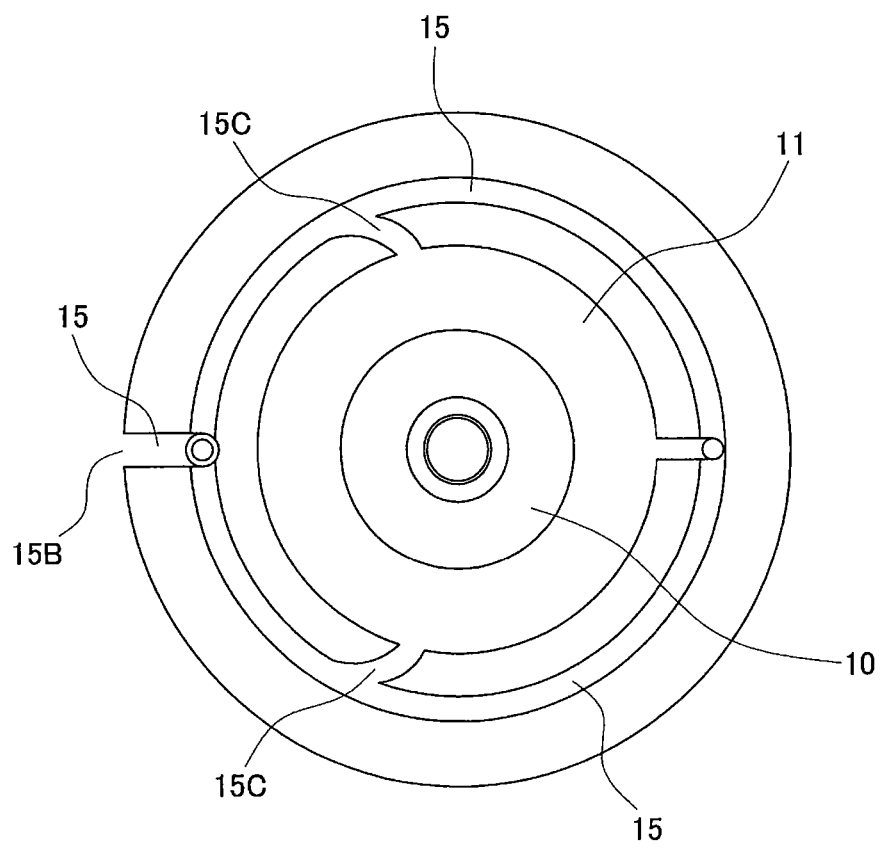
FIG. 17 is a cross-sectional view illustrating the vicinity of a center line of a channel in FIG. 12.

Note that, FIG. 16 is a plan view illustrating an example of the countersinking die block 10. Further, FIG. 17 is a cross-sectional view illustrating the vicinity of a center line of the channel in FIG. 12. Note that, as illustrated in FIG. 17, the channel 15 has slits 15C provided at several positions (two positions in FIG. 17). Thus, the cooling water and the demolding agent (mold releasing agent) are allowed to flow efficiently into the cavity.

Figure 18:
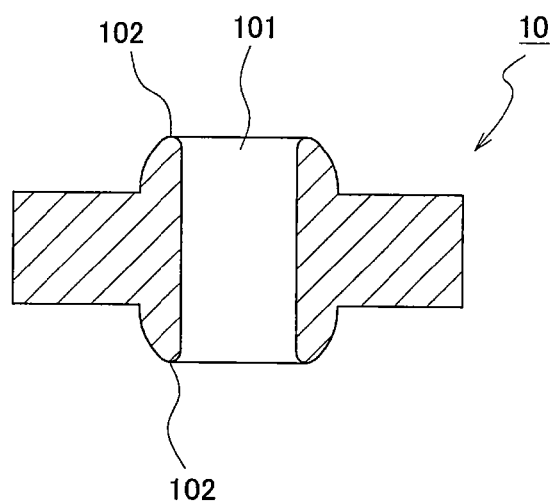
FIG. 18 is an explanatory sectional view illustrating an example of a countersinking die block to be used in a second method according to the present invention.
Figure 19:
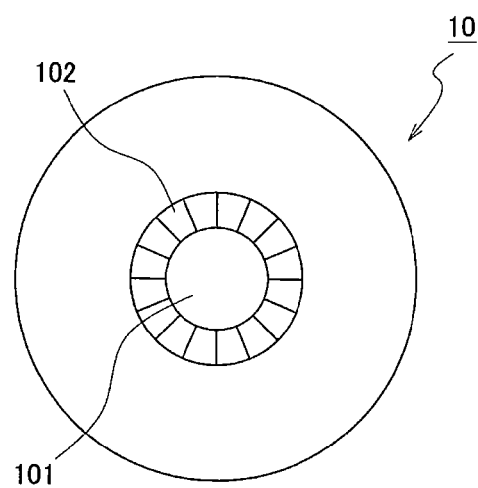
FIG. 19 is a plan view illustrating the example of the countersinking die block to be used in the second method according to the present invention.

In the second method according to the present invention, as illustrated in FIGS. 18 and 19, the countersinking die block 10 has a substantially disc-like shape as a whole, and has a hollow structure with the void 101 formed at a center portion thereof. Besides, countersinking shoulder-like portions 102 are formed around the void 101 in a raised manner. The countersinking shoulder-like portions 102 have an inverted catenary curve surface-like shape as a whole and a polyhedron-like shape having six or more corners (16 corners in FIGS. 18 and 19) in the circumferential direction (approximately into an assembly of objects having a strip shape), to thereby have a structure capable of hollowing the inner surface of the skirt portion into the substantially inverted catenary curve surface-like shape as a whole and the polyhedron-like shape having six or more corners in the circumferential direction.

Note that, when several tens of thousands of products are molded through use of the dies, the wear occurs inevitably. Therefore, in the present invention, the countersinking die block 10 is inverted for further use so that the worn portion may quickly be replaced with a new one (when, for example, wear of approximately 0.1 mm occurs).

Note that, in a case where looseness of the countersinking die block 10 may occur due to the wear or the like when being inverted, the looseness of the countersinking die block 10 is suppressed by coating the surface of the worn portion or the like by an amount corresponding to the wear or the like. In this case, any coating materials such as zinc may be used as long as the surface can be coated with a thick layer.

In the present invention, the above-mentioned countersinking die block 10 is fitted to the lower die, more specifically, the block receiving guides 13 in a mountable and demountable manner. That is, the block receiving guides 13 are configured to support fitting of the countersinking die block 10.

As the block receiving guides 13, there is no particular limitation on the shape or the like as long as the block receiving guides 13 may support fitting of the countersinking die block 10. As illustrated in FIGS. 11 and 12, a cutout portion corresponding to the countersinking shoulder-like portion 102 formed in the countersinking die block 10 is provided to an upper portion of each of the right and left block receiving guides 13.

The forging process for the head section and the countersinking process are carried out by actuating the press punch 6 under a state in which the countersinking die block 10 is fitted to the block receiving guides 13 (lower die) so that the countersinking shoulder-like portion 102 thereof abuts against the inner surface of the skirt portion 202. Thus, the inner surface of the skirt portion 202 is hollowed into the inverted catenary curve surface-like shape with the flat portion left on the bottom rim 204 (in the first method according to the present invention), or alternatively into the inverted catenary curve surface-like shape as a whole and the polyhedron-like shape having six or more corners (16 corners in FIGS. 18 and 19) in the circumferential direction with the flat portion left on the bottom rim 204 (in the second method according to the present invention).

At the same time, the head section 2 is formed, which includes: the main body portion 201 that does not yet have the hexagonal cross-sectional shape at this time but has the hexagonal cross-sectional shape in the subsequent step; and the cylindrical skirt portion 202 provided continuously with the main body portion 201 and formed so as to be spaced radially outward from the main body portion 201 in the expanding manner along the concave surface using the catenary curve surface.

The concave surface using the catenary curve surface, which is formed in the outer surface of the cylindrical skirt portion 202, is obtained by transferring the shape of a lower and inner portion of the lower press punch guides 9 (formed into the concave surface using the catenary curve surface) as illustrated in FIG. 11.

It is preferred that the forging process for the head section and the countersinking process be carried out under a state in which the clearance 16 is generated between the upper die and the lower die so as to serve as a relief position for the wire rod on a lower side of the skirt portion during the forging process for the head section and the countersinking process. The clearance 16 thus generated is effective in preventing damage to the dies. In the conventional case where the clearance 16 is not generated, there is no relief position for an excess portion of the wire rod (residual portion offset after the molding), and therefore the dies cannot withstand. When the clearance 16 was generated, on the other hand, the life of the dies was significantly prolonged to a range of from 5,000 to 10,000 shots.

Note that, when one of the countersinking shoulder-like portions 102 of the countersinking die block 10 is worn, the forging process for the head section and the countersinking process may be carried out in such a manner that the countersinking die block 10 is inverted and fitted to the block receiving guides 13 (lower die) under a state in which another unworn countersinking shoulder-like portion 102 is oriented upward. When both of the countersinking shoulder-like portions 102 are worn, the countersinking die block 10 is replaced with a new one.

In this manner, when the countersinking shoulder-like portion 102 is worn, it is only necessary to invert the countersinking die block 10 or replace the countersinking die block 10 alone without replacing the block receiving guides 13. Thus, efficient manufacture can be carried out.

When carrying out the forging process for the head section and the countersinking process, ultrasonic vibrations may be applied while allowing the cooling water to flow through the channel 15. Further, when demolding the product, ultrasonic vibrations may be applied while allowing the demolding agent (mold releasing agent) to flow through the channel 15. General cooling water and demolding agent (mold releasing agent) may be used as the cooling water and the demolding agent (mold releasing agent) described above. Note that, a fluid may be generally supplied through the channel 15 in both steps carried out before and after upsetting the wire rod serving as a material to be molded.

The forging process for the head section and the countersinking process can be carried out while applying the ultrasonic vibrations to the wire rod and the die, or alternatively the wire rod or the die through the channel 15 and therefore through a liquid delivering pipe 151 described later that is connected thereto, or alternatively from the upper side and lower side of the dies as described later.

In this case, the channel 15 has one end opened as an opening portion 15A in a cavity surface, and has another end 15B opened toward the outside.

The one end 15A of the channel 15 is opened as the opening portion 15A in the cavity surface, thereby being capable of carrying out, for example, both the cooling and the lubrication for the dies.

Further, the another end 15B of the channel 15 is opened toward the outside, and the liquid delivering pipe 151 is connected thereto.

As the liquid delivering pipe 151 described above, it is preferred to use a spiral multiplex pipe.

The spiral multiplex pipe (spiral multiplex tube) is a metal pipe (metal tube) obtained in the following manner. That is, a smooth circular metal pipe formed of, for example, a steel pipe, a stainless steel pipe (such as SUS having heat resistance), or a titanium pipe is formed through a twisting process or the like into a spiral multiplex shape. When the twisting process is carried out in three or four stages, the spiral multiplex pipe may be obtained.

Figure 20:
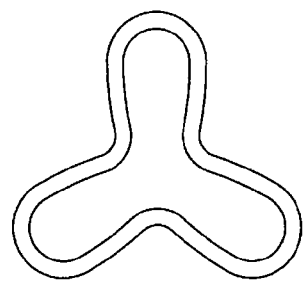
FIG. 20 is an explanatory view illustrating a sectional structure of a spiral triplex pipe (spiral triplex tube) obtained through a twisting process.

FIG. 20 is an explanatory view illustrating a sectional shape of an example of the spiral multiplex pipe (spiral multiplex tube). That is, FIG. 20 is an explanatory view illustrating a sectional structure of a spiral triplex pipe (spiral triplex tube) obtained through the above-mentioned twisting process.

Through use of the spiral multiplex pipe described above, in particular, the spiral triplex pipe, the flow rate can be increased by approximately three times under the same diameter, with the result that a pipe having a smaller diameter can be used and piping installation or the like inside a forging apparatus is facilitated. Moreover, the following advantage is found. That is, a plurality of kinds of liquids are used as the cooling and lubricating oil to be delivered into the cavity of the die through the channel 15, and hence liquid delivering pipes corresponding to those liquids must be used to deliver the liquids into the pipes. When the spiral triplex pipe is used as the liquid delivering pipe, however, the liquids move through the spiral triplex pipe while rotating in a spiral manner (helical manner), and hence the spiral triplex pipe spontaneously plays a role of mixing and stirring. Thus, there is no need to mix and stir the plurality of kinds of liquids.

Note that, the diameter of the spiral triplex pipe is generally 6 to 8 mm, and the spiral triplex pipe to be used has approximately eight to ten turns of twist.

Figure 21:
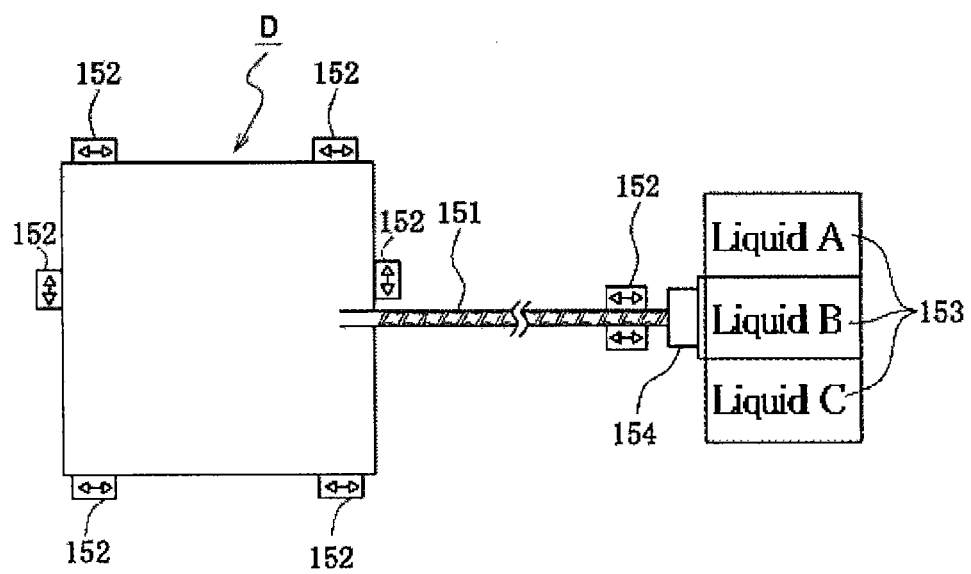
FIG. 21 is an explanatory view illustrating an example of a state in which ultrasonic vibration generating apparatus are arranged on upper and lower sides of a die, and on an outer circumference of a liquid delivering pipe that is formed of a spiral multiplex pipe.

In the present invention, ultrasonic vibration generating apparatus 152 may be arranged on an outer circumference of the liquid delivering pipe 151 that is formed of the spiral multiplex pipe as described above. FIG. 21 illustrates an example of a state in which the ultrasonic vibration generating apparatus 152 are arranged on the outer circumference of the liquid delivering pipe 151 that is formed of the spiral multiplex pipe. In FIG. 21, reference symbol 153 represents a liquid tank (three tanks in FIG. 21, that is, a tank A, a tank B, and a tank C); and reference symbol 154, a liquid pressure pump.

Further, as illustrated in FIG. 21, the ultrasonic vibration generating apparatus 152 may also be arranged on upper, lower, right, and left sides of a die D. Note that, the ultrasonic vibration generating apparatus 152 may be arranged only on the upper and lower sides of the die D or only on the right and left sides of the die D as necessary. It is preferred that the ultrasonic vibration generating apparatus 152 be arranged at approximately three to six positions with equal intervals to the extent possible.

In this manner, the ultrasonic vibration generating apparatus 152 may be arranged on the outer circumference of the liquid delivering pipe 151 that is formed of the spiral multiplex pipe, and on the upper, lower, right, and left sides of the die D.

Each ultrasonic vibration generating apparatus 152 includes, as a basic structure thereof, an ultrasonic generator for generating ultrasonic power, and an ultrasonic transducer (for example, a piezoelectric transducer made of ceramics) for converting electric vibrations generated from the ultrasonic power into mechanical vibrations. Thus, an existing ultrasonic vibration generating apparatus may be used.

The ultrasonic vibrations may be adjusted to be generated continuously or intermittently in accordance with the manufacturing speed or the like. Further, the degree of generation of vibrations may be controlled in accordance with the manufacturing speed or the like.

In the present invention, the ultrasonic vibration generating apparatus 152 are thus arranged on the outer circumference of the liquid delivering pipe 151 that is formed of the spiral multiplex pipe, to thereby apply the ultrasonic vibrations to the liquids passing through the pipe. The present invention does not adopt such the structure that apparatus for generating ultrasonic vibrations are mounted to the liquid tanks containing liquids so as to apply the ultrasonic vibrations to the liquids in the tanks, and the resultant liquids are delivered under pressure. Therefore, the liquid tanks having such structure become unnecessary.

Note that, the ultrasonic waves to be used in the present invention have different frequencies between the ultrasonic vibration generating apparatus provided on the outer circumference of the liquid delivering pipe 151 that is formed of the spiral multiplex pipe, and the ultrasonic vibration generating apparatus provided on the upper, lower, right, and left sides of the die D. However, the appropriate ultrasonic waves may be selected and used as necessary.

In general, the ultrasonic waves to be used in the ultrasonic vibration generating apparatus provided on the upper, lower, right, and left sides of the die D have a frequency of 10 to 50 kHz, preferably 15 to 50 kHz. The ultrasonic waves are used through adjustment within the range of from 15 to 50 kHz as necessary.

On the other hand, the ultrasonic waves to be used in the ultrasonic vibration generating apparatus provided on the outer circumference of the liquid delivering pipe 151 that is formed of the spiral multiplex pipe may have a frequency lower than that of the above-mentioned ultrasonic waves, that is, 5 to 15 kHz in general. The ultrasonic waves are used through adjustment within the range of from 5 to 15 kHz as necessary.

Using the above-mentioned ultrasonic waves within the range of from 5 to 15 kHz, the ultrasonic vibration generating apparatus 152 are arranged on the outer circumference of the liquid delivering pipe 151 that is formed of the spiral multiplex pipe, and the ultrasonic vibrations are applied through intermediation of the pipe to the liquids passing through the pipe. Then, the ultrasonic vibrations are transmitted to the liquids (such as the cooling water and the demolding agent) in the channel 15 connected to the liquid delivering pipe 151, as the ultrasonic vibrations are greatly propagated in the case of liquid and solid.

Further, the ultrasonic vibration generating apparatus 152 are arranged on the upper, lower, right, and left sides of the die D, and the ultrasonic vibrations within the range of from 15 to 50 kHz are applied as described above.

Then, the ultrasonic vibrations are also transmitted to the wire rod and the die, or alternatively the wire rod or the die. Thus, the forging process for the head section and the countersinking process can be carried out while applying the ultrasonic vibrations to the wire rod and the die, or alternatively the wire rod or the die. As a result, it is possible to reduce friction, prevent wear, prevent seizure between the die and the workpiece (wire rod), and to facilitate demolding (mold releasing). Further, it is possible to reduce the usage amount of the demolding agent (mold releasing agent). Therefore, it is possible to enhance the moldability (headability), and to prolong the life of the die.

As described above, in the present invention, the forging process for the head section and the countersinking process can be carried out while applying the ultrasonic vibrations to the wire rod and the die, or alternatively the wire rod or the die.

Note that, the ultrasonic vibration generating apparatus are controlled in the following manner.

(1) As a method of controlling the ultrasonic vibration generating apparatus arranged on the upper, lower, right, and left sides of the die D, any of a manual method and an automatic method may be employed, and the ultrasonic vibration generating apparatus are operable manually or automatically in accordance with the molding cycle of the blank.

(2) The ultrasonic vibration generating apparatus arranged on the outer circumference of the liquid delivering pipe and the ultrasonic vibration generating apparatus arranged on the upper, lower, right, and left sides of the die D are basically used in combination and association with each other, but are operable independently of each other as necessary.

Through use of the ultrasonic waves described above, the forging process for the head section and the countersinking process are carried out while applying the ultrasonic vibrations to the wire rod and the die, or alternatively the wire rod or the die, and in addition, the product is demolded while applying the ultrasonic vibrations to the wire rod and the die, or alternatively the wire rod or the die. Thus, it is possible to reduce friction, prevent wear, and to facilitate demolding.

The above-mentioned steps are carried out while replacing the punch and the guide, and may be carried out through use of a multi-platen press or the like.

After the end of the step of carrying out the forging process for the head section and the countersinking process as described above, the molded product is pushed out by the push-out pin 17, and is transported to the subsequent step of carrying out a trimming process for a hexagonal head section.

Note that, in the above-mentioned steps, the supply of the liquids through the channel is controlled in the following manner.

(1) At the time when a blank to be molded or a partially molded product is set at a predetermined position in the die, the liquids are automatically supplied into the cavity through the channel.

(2) Subsequently, at the time (instant) when the liquids are filled by approximately 85% of the cavity (space), the delivery of the liquids under pressure is stopped by automatic control, and then molding is started.

(3) At this time, the liquids in the cavity are ejected through the channel, and pass through the liquid delivering pipe 151 provided outside the die, to thereby enter the return liquid tanks 153.

(4) The liquids cooled inside the return liquid tanks 153 are supplied again from the return liquid tanks 153 into the cavity through the liquid delivering pipe 151 (such as the spiral multiplex pipe) by automatic control.

(5) When the amount of the liquids becomes smaller, the liquids are newly added and replenished in a mechanism that is controlled by a series of automatic control procedures.

[Step of Carrying Out Trimming Process for Hexagonal Head Section]

The subsequent step is a step of carrying out the trimming process for the hexagonal head section.

This step is a step of processing the main body portion of the head section into a hexagonal cross-sectional shape. This step is carried out through use of an automatic trimming machine (also referred to as "automatic trimmer") (not shown).

Note that, the main body portion may be processed into a rectangular or oval shape as necessary (polygonization process).

A general automatic trimming machine may be used as the automatic trimming machine described above.

Through this step, the main body portion of the head section of the locking bolt is processed into the hexagonal cross-sectional shape, and the contour of the locking bolt is substantially determined.

Note that, instead of the general hexagon head bolt with the head section processed into the hexagonal cross-sectional shape, a hexagon socket head bolt called "cap screw," which has a hexagon socket in a head of a round head bolt, may be formed as necessary through replacement of tooling.

[Step of Carrying Out Rolling Process and Process Finishing]

The subsequent step is a step of carrying out a rolling process and process finishing.

Through the rolling process, threads (thread ridges) are formed on the outer circumference of the shank section 1.

Further, through the process finishing, an excess portion is removed so that the lower edge surface 203 of the outer surface of the skirt portion 202 becomes parallel to the axis of the main body portion 201.

As a result, a desired locking bolt can be manufactured as illustrated in FIGS. 1 and 2.

When carrying out the rolling process, pointing (tip chamfering) is carried out in advance.

Note that, the threads may be formed through cutting or grinding work as necessary instead of the rolling process.

Any of the rolling process and the process finishing may be carried out first.

The rolling process is carried out through use of a rolling machine or the like.

Further, the process finishing is carried out through cutting and/or grinding, that is, cutting and grinding, or alternatively cutting or grinding.

[Heat Treatment Step (Thermal Refining Step)]

Further, for the bolt required to have strength, a "heat treatment step (thermal refining step)" is carried out through quenching and tempering after the above-mentioned step of carrying out the rolling process and the process finishing. The heat treatment only needs to be carried out by a common method in accordance with the level of strength to be required.

[Surface Treatment Step]

Still further, a "surface treatment step (surface treatment process)" such as plating is carried out as necessary after the above-mentioned heat treatment step (thermal refining step).

After that, final inspection is carried out, to thereby obtain a product. In the final inspection step, inspection is carried out for whether or not the shape of the product falls within the specification, whether or not a fracture is generated, and the like.

As described above, in the methods according to the present invention (first method according to the present invention and second method according to the present invention), the locking bolt can be manufactured basically through use of the header, and the cutting work that requires great skill is not necessary therefor.

Thus, with the methods according to the present invention (first method according to the present invention and second method according to the present invention), it is possible to efficiently manufacture the locking bolt capable of tightly fixing a member or the like at an extremely high degree of firmness without being loosened even when vibrations are repeatedly applied thereto.

The locking bolts obtained by the methods according to the present invention (first method according to the present invention and second method according to the present invention), and by the present invention (first aspect of the present invention and second aspect of the present invention) have both cleared a predetermined condition of 17 minutes in a looseness test carried out by random sampling through use of a predetermined screw looseness tester.

The first reason why the locking bolts manufactured by the methods according to the present invention (first method according to the present invention and second method according to the present invention), and by the present invention (first aspect of the present invention and second aspect of the present invention) have constantly cleared the predetermined condition of 17 minutes in the looseness test and have been maintained in the locking state is because the locking bolts have the structure in which the outer surface of the skirt portion is formed in the expanding manner along the concave surface using the catenary curve surface, the lower edge surface of the outer surface of the skirt portion is parallel to the axis of the main body portion, and the inner surface of the skirt portion is hollowed into the inverted catenary curve surface-like shape with the flat portion left on the bottom rim (in the first aspect of the present invention), or alternatively into the substantially inverted catenary curve surface-like shape as a whole and the polyhedron-like shape having six or more corners in the circumferential direction with the flat portion left on the bottom rim (in the second aspect of the present invention).

Further, the second reason why the locking bolts manufactured by the methods according to the present invention (first method according to the present invention and second method according to the present invention), and by the present invention (first aspect of the present invention and second aspect of the present invention) have constantly cleared the predetermined condition of 17 minutes in the looseness test and have been maintained in the locking state is because the root of the skirt portion 202 that is connected to the shank, that is, the intersection (groove portion) 205 between the inner surface of the skirt portion 202 and the shank section 1 is formed into an approximately-round shape (round shape), to thereby have roundness. When the intersection (groove portion) 205 between the inner surface of the skirt portion 202 and the shank section 1 is thus formed into an approximately-round shape (round shape), to thereby have roundness, the stress is applied uniformly, and the torque is not applied more than necessary, with the result that the member or the like can be fixed easily. Further, the contact pressure is increased, with the result that the locking bolt is not loosened.

In this case, when the root of the skirt portion 202 that is connected to the shank, that is, the intersection (groove portion) 205 between the inner surface of the skirt portion 202 and the shank section 1 is not formed to have roundness but have an angular shape (wedge shape), in which straight lines intersect with each other, the leading end has a wedge shape, and hence the stress concentrates at the leading end (wedge) portion. As a result, the contact pressure is small, and therefore the locking bolt is easily loosened. Thus, the locking bolt cannot clear the predetermined condition of 17 minutes in the above-mentioned looseness test.

Figure 22:
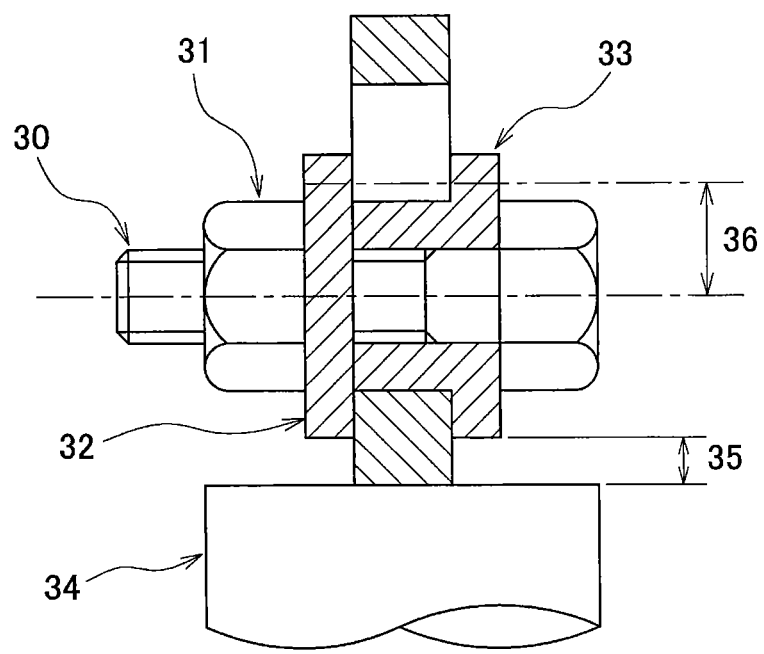
FIG. 22 is an explanatory view illustrating a situation where a looseness test method is carried out.

For the locking bolt thus obtained, a looseness test using a high-speed screw looseness tester (looseness test using a tester conforming to NAS 3550 in the U.S.) was carried out in accordance with a method illustrated in FIG. 22. Table 1 shows results thereof. Note that, when the locking bolt or nut is not loosened for 17 minutes in this test, it is assumed that the locking bolt or nut clears the condition and is maintained in the locking state.

In FIG. 22, reference symbol 30 represents a bolt to be tested; reference symbol 31, a nut to be tested; reference symbol 32, a washer (metal washer); reference symbol 33, a vibration barrel; reference symbol 34, a vibration applying table; reference symbol 35, a vibration applying stroke; and reference symbol 36, an impact stroke.

[Looseness Test Method]

Bolts to be tested (first locking bolt according to the present invention as illustrated in the figure, which was manufactured into the shape as illustrated in FIGS. 1 and 2 by the first method according to the present invention, and second locking bolt according to the present invention as illustrated in the figure, which was manufactured into the shape as illustrated in FIGS. 5 and 6 by the second method according to the present invention; M16×80–4.8) were mounted to the tester together with nuts (nuts to be tested) mating therewith, respectively, and the test was carried out under the following conditions. When the bolts and nuts were not loosened for 17 minutes, the return torque was measured.

Tester: high-speed screw looseness tester
Vibration conditions:
　Number of vibrations: 1,780 rpm
　Vibration applying table stroke: 11 mm
　Impact stroke: 19 mm
　Vibration direction: orthogonal to bolt shank
Determination of looseness: determined that the bolt is "loosened" when alignment marks of the bolt to be tested, the nut to be tested, and the washer (metal washer) are displaced and the washer becomes turnable by a hand.

TABLE 1

| Name of test item | Fastening torque (N·m) | Result | Return torque (N·m) |
|---|---|---|---|
| First locking bolt according to present invention | 250 | Remain unloosened for 17 minutes | 219.2 |
| Second locking bolt according to present invention | 247 | Remain unloosened for 17 minutes | 216.3 |

According to the results shown in Table 1, it was found that both of the first locking bolt according to the present invention and the second locking bolt according to the present invention, which were manufactured by the methods according to the present invention, respectively, were not loosened even in the test under the condition of 17 minutes.

The locking bolts thus obtained can be used effectively for tightly fixing various kinds of members or the like.

Reference Signs List
1: shank section
2: head section
2A: wire rod upsetting portion
201: main body portion
202: skirt portion
203: lower edge surface of outer surface of skirt portion 202
204: bottom rim of inner surface of skirt portion 202
205: root of skirt portion 202 that is connected to shank (intersection between inner surface of skirt portion 202 and shank section)
3: knife
4: quill
5: stopper
6: press punch
7: upper press punch guide
8: middle press punch guide
9: lower press punch guide
10: countersinking die block
101: void
102: countersinking shoulder-like portion
11: lower punch guide
12: block guide
13: block receiving guide
14: inner die guide
15: fluid channel
15A: opening portion
15B: other end of channel
15C: slit
151: liquid delivering pipe
152: ultrasonic vibration generating apparatus
153: liquid tank
154: liquid pressure pump
16: clearance
17: push-out pin
18: push-out pin guide
30: bolt to be tested
31: nut to be tested
32: washer
33: vibration barrel
34: vibration applying table
35: vibration applying stroke
36: impact stroke
A: locking bolt according to first aspect of present invention
B: locking bolt according to second aspect of present invention
P: parting line
S: wire rod
D: entire die
H: header

The invention claimed is:

1. A locking bolt, comprising:
a shank section threaded on an outer circumference thereof; and
a head section provided at one end of the shank section, wherein the head section comprises:
　a main body portion having a hexagonal cross-sectional shape; and
　a cylindrical skirt portion provided continuously with the main body portion and formed so as to be spaced radially outward from the main body portion in an expanding manner along a concave surface using a catenary curve surface,
wherein the locking bolt has a structure in which:
　a lower edge surface of an outer surface of the cylindrical skirt portion is parallel to an axis of the main body portion; and
　an inner surface of the cylindrical skirt portion is hollowed into an inverted catenary curve surface-like shape with a flat portion left on a bottom rim, and
wherein an intersection between the inner surface of the cylindrical skirt portion and the shank section is formed into an approximately-round shape, to thereby have roundness.

2. A locking bolt, comprising:
a shank section threaded on an outer circumference thereof; and
a head section provided at one end of the shank section, wherein the head section comprises:
　a main body portion having a hexagonal cross-sectional shape; and
　a cylindrical skirt portion provided continuously with the main body portion and formed so as to be spaced radially outward from the main body portion in an expanding manner along a concave surface using a catenary curve surface, wherein the locking bolt has a structure in which:
- a lower edge surface of an outer surface of the cylindrical skirt portion is parallel to an axis of the main body portion; and
- an inner surface of the cylindrical skirt portion is hollowed into a substantially inverted catenary curve surface-like shape as a whole and a polyhedron-like shape having six or more corners in a circumferential direction with a flat portion left on a bottom rim, and wherein an intersection between the inner surface of the cylindrical skirt portion and the shank section is formed into an approximately-round shape, to thereby have roundness.

3. A method of manufacturing a locking bolt,
the locking bolt comprising:
- a shank section threaded on an outer circumference thereof; and
- a head section provided at one end of the shank section, the head section comprising:
  - a main body portion having a hexagonal cross-sectional shape; and
  - a cylindrical skirt portion provided continuously with the main body portion and formed so as to be spaced radially outward from the main body portion in an expanding manner along a concave surface using a catenary curve surface,
- the locking bolt having a structure in which:
  - a lower edge surface of an outer surface of the cylindrical skirt portion is parallel to an axis of the main body portion; and
  - an inner surface of the cylindrical skirt portion is hollowed into an inverted catenary curve surface-like shape with a flat portion left on a bottom rim, and
  - an intersection between the inner surface of the cylindrical skirt portion and the shank section being formed into an approximately-round shape, to thereby have roundness, the method comprising:
using a header comprising:
- a cut-off knife;
- an upper die comprising a punch; and
- a lower die comprising a countersinking die block fitted thereto in a mountable and demountable manner, for carrying out a countersinking process to hollow the inner surface of the cylindrical skirt portion into the inverted catenary curve surface-like shape;

cutting off a forgeable wire rod into a predetermined length by the cut-off knife, and subsequently carrying out, on the cut off forgeable wire rod, a heading process for the head section and the countersinking process by the upper die and the lower die so as to form, at one end of the forgeable wire rod, the head section comprising the main body portion and the cylindrical skirt portion, which is provided continuously with the main body portion and formed so as to be spaced radially outward from the main body portion in the expanding manner along the concave surface using the catenary curve surface, to thereby provide the structure in which the inner surface of the cylindrical skirt portion is hollowed into the inverted catenary curve surface-like shape with the flat portion left on the bottom rim;

subsequently processing the main body portion of the head section into the hexagonal cross-sectional shape through use of an automatic trimming machine;

subsequently threading an outer circumference of the forgeable wire rod in a portion other than the head section through a rolling process so as to form the shank section; and subsequently removing an excess portion so that the lower edge surface of the outer surface of the cylindrical skirt portion becomes parallel to the axis of the main body portion.

4. A method according to claim 3,
wherein the countersinking die block has a horizontally symmetrical shape in which countersinking shoulder-like portions for carrying out the countersinking process are provided at an upper end and a lower end of the countersinking die block, and wherein, when one of the countersinking shoulder-like portions is worn, the countersinking die block is inverted for further use.

5. A method according to claim 3, wherein the heading process for the head section and the countersinking process are carried out while applying ultrasonic vibrations to the forgeable wire rod, the upper die, and the lower die, or alternatively the forgeable wire rod, the upper die, or the lower die.

6. A method according to claim 3, wherein the heading process for the head section and the countersinking process are carried out under a state in which a clearance is generated between the upper die and the lower die so as to serve as a relief position for the forgeable wire rod on a lower side of the cylindrical skirt portion during the heading process for the head section and the countersinking process.

7. A method according to claim 3, further comprising carrying out a heat treatment step after a step of carrying out process finishing for removing the excess portion.

8. A method according to claim 7, further comprising carrying out a surface treatment step after the heat treatment step.

9. A method of manufacturing a locking bolt,
the locking bolt comprising:
- a shank section threaded on an outer circumference thereof; and
- a head section provided at one end of the shank section, the head section comprising:
  - a main body portion having a hexagonal cross-sectional shape; and
  - a cylindrical skirt portion provided continuously with the main body portion and formed so as to be spaced radially outward from the main body portion in an expanding manner along a concave surface using a catenary curve surface,
- the locking bolt having a structure in which:
  - a lower edge surface of an outer surface of the cylindrical skirt portion is parallel to an axis of the main body portion; and
  - an inner surface of the cylindrical skirt portion is hollowed into a substantially inverted catenary curve surface-like shape as a whole and a polyhedron-like shape having six or more corners in a circumferential direction with a flat portion left on a bottom rim, and
  - an intersection between the inner surface of the cylindrical skirt portion and the shank section being formed into an approximately-round shape, to thereby have roundness, the method comprising:

using a header comprising:
- a cut-off knife;
- an upper die comprising a punch; and
- a lower die comprising a countersinking die block fitted thereto in a mountable and demountable manner, for carrying out a countersinking process to hollow the inner surface of the cylindrical skirt portion into the substantially inverted catenary curve surface-like shape as a whole and the polyhedron-like shape having six or more corners in the circumferential direction;

cutting off a forgeable wire rod into a predetermined length by the cut-off knife, and subsequently carrying out, on the cut off forgeable wire rod, a heading process for the head section and the countersinking process by the upper die and the lower die so as to form, at one end of the forgeable wire rod, the head section comprising the main body portion and the cylindrical skirt portion, which is provided continuously with the main body portion and formed so as to be spaced radially outward from the main body portion in the expanding manner along the concave surface using the catenary curve surface, to thereby provide the structure in which the inner surface of the cylindrical skirt portion is hollowed into the substantially inverted catenary curve surface-like shape as a whole and the polyhedron-like shape having six or more corners in the circumferential direction with the flat portion left on the bottom rim;

subsequently processing the main body portion of the head section into the hexagonal cross-sectional shape through use of an automatic trimming machine;

subsequently threading an outer circumference of the forgeable wire rod in a portion other than the head section through a rolling process so as to form the shank section; and subsequently removing an excess portion so that the lower edge surface of the outer surface of the cylindrical skirt portion becomes parallel to the axis of the main body portion.

10. A method according to claim 9, wherein the countersinking die block has a horizontally symmetrical shape in which countersinking shoulder-like portions for carrying out the countersinking process are provided at an upper end and a lower end of the countersinking die block, and wherein, when one of the countersinking shoulder-like portions is worn, the countersinking die block is inverted for further use.

11. A method according to claim 9, wherein the heading process for the head section and the countersinking process are carried out while applying ultrasonic vibrations to the forgeable wire rod, the upper die, and the lower die, or alternatively the forgeable wire rod, the upper die, or the lower die.

12. A method according to claim 9, wherein the heading process for the head section and the countersinking process are carried out under a state in which a clearance is generated between the upper die and the lower die so as to serve as a relief position for the forgeable wire rod on a lower side of the cylindrical skirt portion during the heading process for the head section and the countersinking process.

13. A method according to claim 9, further comprising carrying out a heat treatment step after a step of carrying out process finishing for removing the excess portion.

14. A method according to claim 13, further comprising carrying out a surface treatment step after the heat treatment step.

* * * * *